Jan. 20, 1931.  J. P. WALKER  1,789,716
OIL AND GAS SEPARATOR
Filed Aug. 15, 1927  2 Sheets-Sheet 2

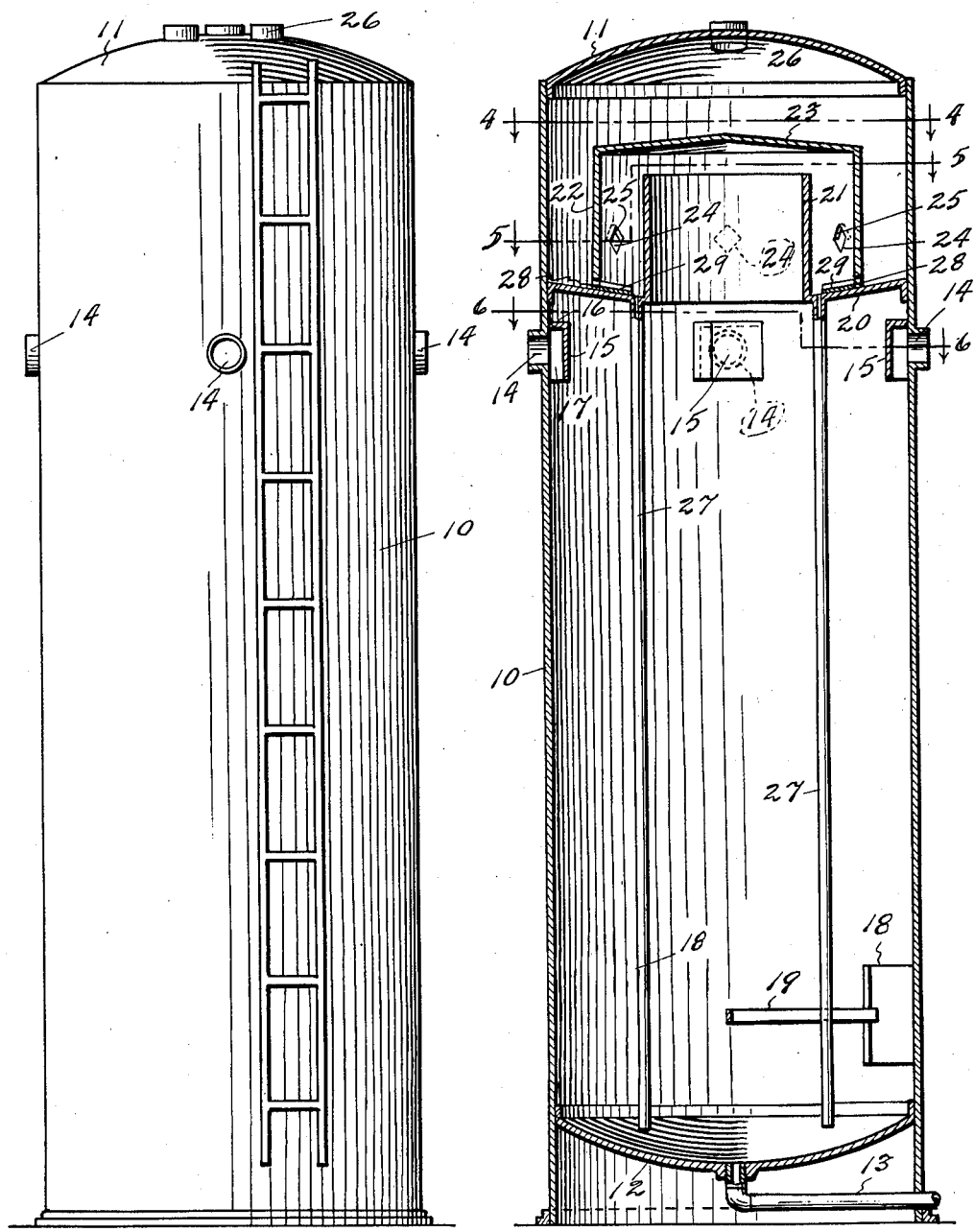

Inventor
J. P. Walker
By Jack A. Schley
Attorney

Patented Jan. 20, 1931

1,789,716

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

OIL AND GAS SEPARATOR

Application filed August 15, 1927. Serial No. 212,943.

This invention relates to new and useful improvements in oil and gas separators.

One object of the invention is to provide an improved oil and gas separator of a simple and efficient construction, whereby a highly satisfactory separation may be carried out at a nominal expense.

Another object of the invention is to provide inlet deflectors of a particular type adapted to divert the inflowing fluid circumferentially and downwardly within the separator tank.

A construction designed to carry out the invention will be hereinafter described, together with other features of the invention.

Figure 3:
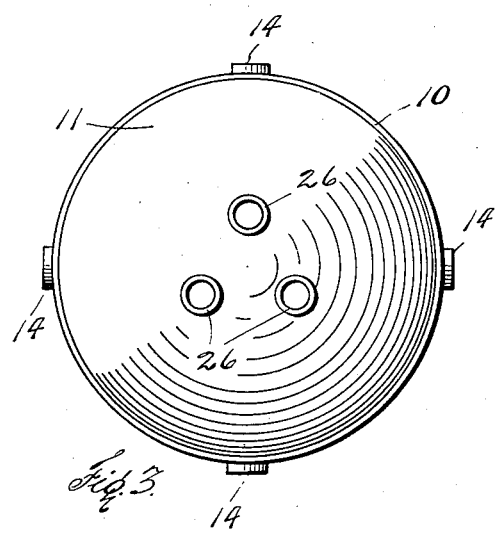
Figure 4:
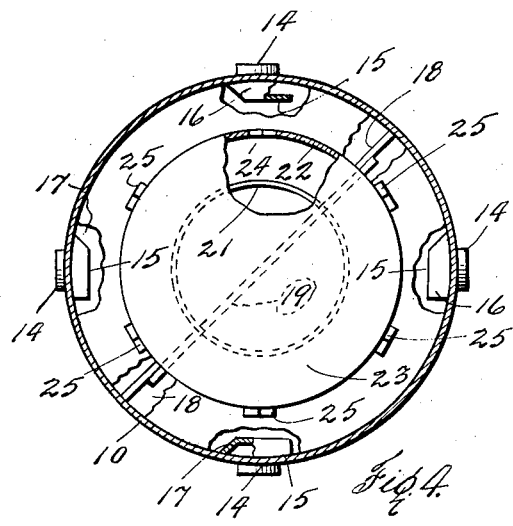
Figure 5:
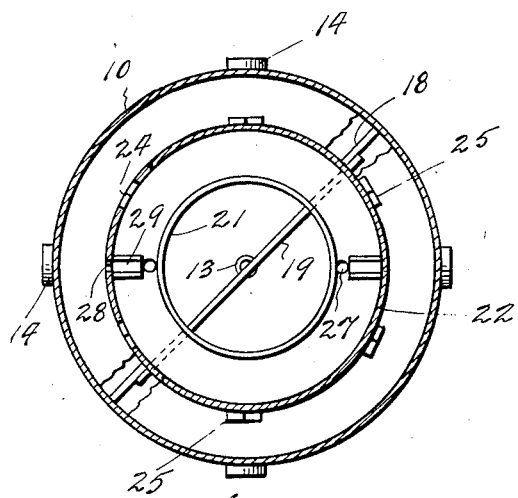
Figure 6:
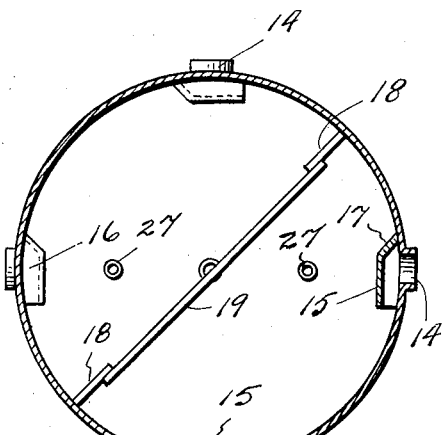
Figure 7:
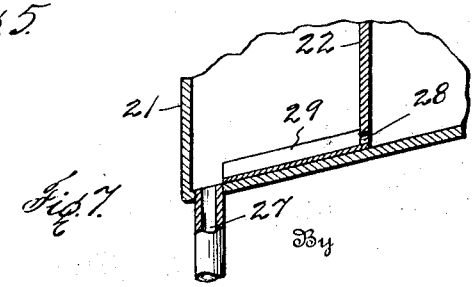

The invention will be more readily understood from a reading of the following specification and by reference to the accompanying drawings, in which an example of the invention is shown and wherein:

Fig. 1 is an elevation of a separator constructed in accordance with the invention, Fig. 2 is a vertical sectional view of the same, Fig. 3 is a plan view, Fig. 4 is a horizontal cross-sectional view taken on the line 4—4 of Fig. 2, Fig. 5 is a horizontal cross-sectional view taken on the line 5—5 of Fig. 2, Fig. 6 is a horizontal cross-sectional view taken on the line 6—6 of Fig. 2, and Fig. 7 is a detail of one of the drains.

In the drawings the numeral 10 designates an upright cylindrical tank having a crowned top 11 and a dished bottom 12 elevated sufficiently for the connection of a drain pipe 13 thereunder, which may be equipped with a suitable cut off (not shown). At the upper portion of the tank I provide equi-distant inlet collars 14 for connecting with the pipes which supply the oil and gas to be separated. These collars may be attached in any suitable manner and at any desirable angle.

Within the tank I mount deflectors 15 covering the inlets and suitably fastened, as by welding, to the inner wall of the tank. Each deflector has its front and bottom open and its top 16 and rear end 17 closed, whereby the inflowing fluid is directed circumferentially of the tank and the liquid portions thereof are permitted to flow downwardly. The separation of the oil and gas begins as the fluid is discharged into the tank.

The heavier fluids will tend to hug the inner wall and take a downward course to the bottom of the tank. To arrest circumferential motion, opposite baffles 18 extend radially from the inner tank wall and are braced by a cross bar 19. These baffles settle the liquids and prevent undue agitation of the liquids stored in the bottom of the tank.

The light fluids and gas ascend in the tank, particularly after they are released from the whirling inflow. Just above the deflectors 15 I secure a circular tray or partition 20 inclined downwardly toward the center of the tank. A vertical cylindrical flue 21, having its lower edge secured to the inner circular edge of the tray, extends upwardly. This flue is comparatively large in diameter and has sufficient height to cause the fluids to scrub against its walls while rising through it, thus separating some of the entrained liquid therefrom, which flows back into the tank.

A cylindrical or box-like hood 22 surrounds and covers the flue. The hood is somewhat larger in diameter and is spaced intermediate the flue and the tank wall, being secured to the tray. A conical top 23 is provided on the hood, so that liquids will flow therefrom. In the side of the hood I provide a plurality of spaced outlet openings 24 which, for convenience, are diamond shaped. Inclined guard flanges 25 are bent outwardly from the upper sides of each outlet 24.

The fluids rising in the flue 21 either pass over the edge of said flue or come into contact with the under side of the top 23. It will be understood that there is more or less of a current flowing through the tank to the gas outlet, owing to the pressure of the inflowing fluid and the escape of the gas through the gas outlets 26 in the top 11. The fluids rising over the top of the flue are drawn down to the outlets 24 and are thus scrubbed against the flue and the inner walls of the hood. The liquids thus separated are collected in the tray 20 and conducted therefrom by drain pipes 27 leading down to the bottom of the tank.

The fluids passing through the outlets 24 climb over the outside of the hood in the upper portion of the tank and finally escape through the gas outlets 26. In passing over the hood and through the upper portion of the tank, the fluids are given their final scrubbing at which time a final separation of the oil and gas is carried out.

Liquids flowing down the tank wall as well as down the hood are collected in the tray, the guards 25 deflecting the liquids from the outlets 24. The collected liquids flow through openings 28 in the lower edge portion of the hood and are conducted by troughs 29 to the pipes 27.

Various changes in the size and shape of the different parts, as well as modifications and alterations, may be made within the scope of the appended claims.

What I claim, is:

1. In an oil and gas separator, an upright tank, fluid inlets in the sides of the tank, an inclined tray secured within the tank above said inlets and having its center open, a vertical flue rising from the center of the tray, a hood mounted around the flue, the hood having outlets in its sides, having said hood also depending below the top of the flue and a closed conical top for draining liquids therefrom, and drain pipes depending from the tray within the hood, the tank having a gas outlet in its top, the outlets of the hood having guards extending outwardly for deflecting down-flowing liquids from said outlets.

2. In an oil and gas separator, an upright tank, fluid inlets in the sides of the tank, an inclined tray secured within the tank above said inlets and having its center open, a vertical flue rising from the center of the tray, a hood mounted around the flue, the hood having a side wall depending below the top of the flue and formed with outlets, drain pipes leading from the tray within the hood, liquid drain openings in the bottom of the hood communicating with a space between the hood and tank, and troughs leading from the said drain openings to the drain pipes.

3. In an oil and gas separator, an upright tank having a gas outlet at its top, fluid inlets discharging at the sides of the tank, an inclined tray secured within the tank above said inlets and having its center open, a vertical flue rising from the center of the tray, a hood enclosing said flue and having a closed top and its side formed with outlets, a drain leading from the tray within the hood, and discharging below the oil level and downwardly inclined guard flanges bent outwardly from the upper sides of the outlets.

4. In an oil and gas separator, an upright tank having a gas outlet at its top, fluid inlets in the sides of the tank, an inclined tray secured within the tank above said inlets and having its center open, a vertical flue rising from the center of said tray, a closed hood enclosing the flue with its side wall depending below the top of the flue and formed with outlets and drain openings in the bottom of said wall communicating with a space between the hood and tank, and a drain pipe leading from the tray within the hood and discharging below the inlets.

5. In an oil and gas separator, an upright tank having a gas outlet at its top, fluid inlets in the upper portion of the side wall of the tank, deflectors within the tank constructed to deflect the inflowing fluid circumferentially and downwardly of said wall, an inclined tray in the tank directly above said inlets and having an open center, a vertical flue disposed at said center entirely above the tray, a hood having a closed top above said flue and spaced side walls formed with outlets above the lower edge of said hood, and means for draining liquid from the exterior of the hood and beneath its lower edge toward the center of the tray, and drain means extending from the center of the tray to a point below the inlets.

In testimony whereof I affix my signature.

JAY P. WALKER.